Dec. 18, 1962  F. F. POLIZZANO  3,069,490
ANCHORING OF METALLIC SHEATHED CABLES
Filed Sept. 26, 1960
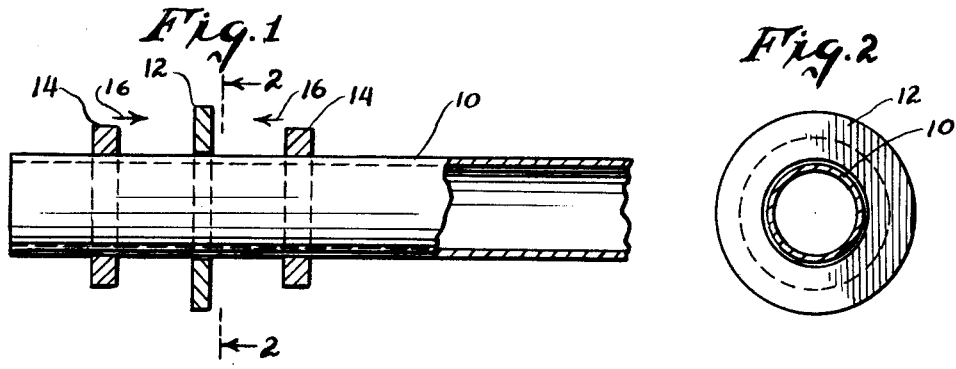
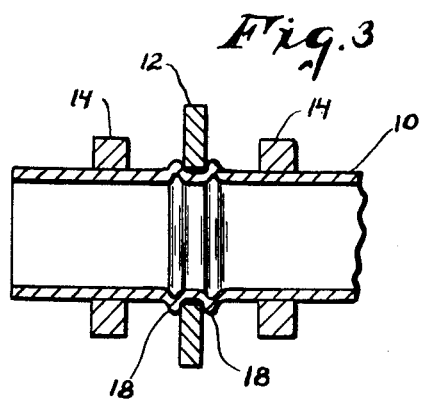
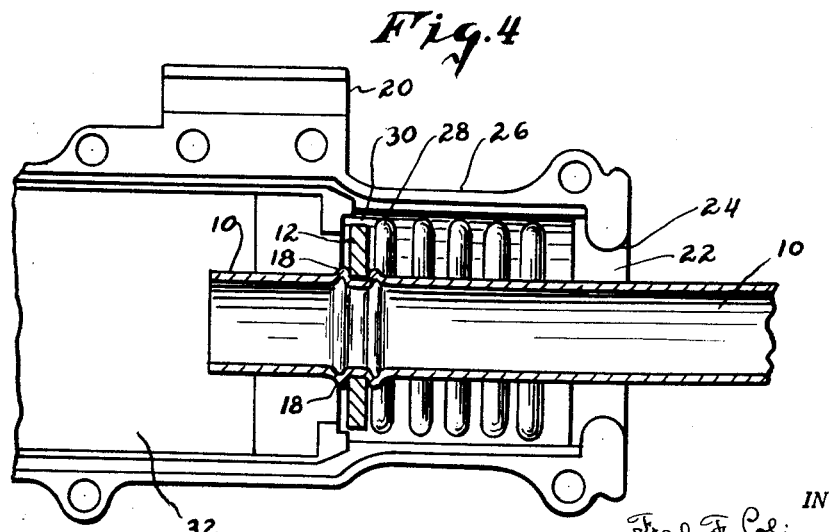
INVENTOR.
Fred F. Polizzano
BY
Emery, Whittemore, Sandoe & Graham
ATTORNEYS

United States Patent Office 3,069,490
Patented Dec. 18, 1962

3,069,490
ANCHORING OF METALLIC SHEATHED CABLES
Fred F. Polizzano, Allendale, N.J., assignor to General Cable Corporation, New York, N.Y., a corporation of New Jersey
Filed Sept. 26, 1960, Ser. No. 58,514
1 Claim. (Cl. 174—65)

This invention relates to metallic sheathed cables and, more particularly, to improved method and apparatus for terminating such cables.

Commercially available junction boxes of a single size to contain the splice between ends of plastic sheathed cables are known to the art. The advantages in the stocking and use of a single junction box for a plurality of sizes of cables are well known.

Similarly, it would be desirable to provide a junction box with a standard inlet diameter for a range of sizes of metallic sheathed cables, such as aluminum sheathed cables. However, a firm anchor between the cable sheath and the junction box is necessary with metallic sheathed cable since, without such anchoring, thermal expansion of the metallic sheath causes undue and often destructive movement of the splice within the box.

The art has used a single junction box with special anchoring devices having diametric adapters to cover a range of sizes of cables. However, such devices have not been entirely satisfactory since stocking of the adapters is only slightly less of a burden than stocking of different box sizes.

It is, therefore, one object of this invention to provide a cable junction for metallic sheathed cables in which a single junction will accommodate a range of cable sizes.

It is a further object of this invention to provide a standard fitting adaptable for use with a plurality of cable sizes.

It is a further object if this invention to provide an improved method for terminating cable in a standard termination.

In accordance with a preferred embodiment of this invention, there is provided a split junction box adapted to receive a range of cable sizes and to enclose the splice between cables. The junction box is adapted to anchor an annular, thin fitting affixed to the sheath of the metallic sheathed cable.

The fitting preferably is an annular, thin member, such as a washer. The outer diameter is selected at a predetermined size for a range of cable sizes; the inner diameter varies to match the outer diameter of each cable. The fitting is secured on the cable sheath by a radially extending ridge or upset in the sheath on each side of the fitting.

The fitting is affixed to the cable by selecting a fitting having an inner diameter slightly larger than the outer diameter of the cable sheath, and slipping this fitting back a short distance over the end of the sheath. The sheath is upset on both sides of the fitting to affix the fitting firmly to the sheath. To upset the sheath, clamps are applied to the sheath on opposite sides of the fitting, spaced a short distance therefrom, and pulled together towards the fitting to axially compress the sheath. When the axial compressive force exceeds the yield strength of the sheath metal, radially extending ridges or upsets will be formed on both sides of the fitting. The fitting serves as a radial clamp to restrict sheath buckling and to control sheath barrelling during the compressing operation. The upsets secure the fitting to the sheath rigidly. The fitting may then be clamped by the junction box to prevent movement of the cable within the box.

This invention will be more clearly understood by reference to the following description taken in conjunction with the accompanying drawings, of which:

FIG. 1 is a cross section view illustrating one step in the method of affixing a fitting to the cable;

FIG. 2 is a cross section view taken along lines 2—2 of FIG. 1;

FIG. 3 is a cross section view illustrating another step in the method of affixing the fitting to the sheath of the cable; and FIG. 4 is a cross section view of a cable junction in accordance with this invention.

In FIGS. 1 and 2 there is shown a metallic sheathed cable 10, such, for example, as an aluminum sheathed cable, 0.95 in. in diameter having a sheath wall thickness of 0.060 in.

The termination fitting 12 preferably is an annular steel washer having a predetermined outer diameter for a range of cable sizes. The inner diameter is selected so that it is slightly larger than the outer diameter of the cable sheath, so that it can be slipped onto the end of the sheath. For example, a steel washer with an inner diameter of 0.965 in. and a thickness of 0.150 in. has been used satisfactorily with the 0.95 in. diameter aluminum sheathed cable.

Upsetting clamps 14 are clamped on the cable astraddle, i.e. on each side of the washer position, spaced a short distance therefrom, and moved together in the direction illustrated by arrows 16 to place the sheath section between the clamps in axial compression above the yield strength of the sheath metal to upset the sheath metal. Since upsetting a metal by such compression is well known to the art, the process is illustrated schematically.

As the axial compression exceeds the yield strength of the metal, the sheath will tend to barrel outwardly. The washer or fitting 12 restricts the barreling effect at the center causing the formation of a flange or an upset 18 on each side of the washer, as is best shown in FIG. 3. Additionally, the washer prevents buckling of the tube. In this manner, the washer is rigidly fastened to the tube by the circumferential flanges or upsets on each side of the fitting. In the cable specifically set forth above as an example, the sheath was upset by clamping the compression jaws 1.07 in. apart and upsetting the metal until the distance between the jaws was approximately 0.45 in.

The fitting is rigidly secured to the sheath. Tests of the assembly by applying a static load to the fitting while holding the cable clamped showed that the static load required to pull the fitting from the sheath was between 75% and 90% of the breaking load of the sheath.

By providing fittings of uniform, predetermined outer diameter and different inner diameters for a plurality of sizes of cable, a single junction box may be employed for splicing of a range of cable sizes. A suitable junction box is shown in FIG. 4.

In FIG. 4 there is shown a junction box 20 which is preferably formed in two halves which can be opened during splicing and reassembled by bolts and nuts in conventional fashion. The junction box is provided with an entrance aperture 22 of standard diameter to accommodate a range of cable sizes up to the maximum size for which the box is designed. The lip 24 forming the entrance diameter is carried on an extended neck portion 26 having a plurality of laterally displaced ridges 28 separating the neck into a similar plurality of laterally displaced annular clamp surfaces 30 to receive the fitting 12 on cable 10. The spaces between ridges are preferably varied to receive different thicknesses of the fitting 12 in different positions along the neck. In this manner, the amount of movement may be controllably held within predetermined limits despite change of fitting sizes.

As will be noted, by using washers with a uniform

O.D. and different I.D.'s, a range of cable sizes can easily be accommodated with simple sheath upsetting tools having the necessary ranges of grips. Thus, the same economy in stocking and ease of installation can be had with metallic sheathed cable as is presently found in the junction boxes for plastic sheathed cable.

In addition to aluminum sheathed cable, the method of this invention is equally applicable to other metallic sheathed cables and to the reinforced plastic sheaths currently in use by the art.

This invention may be variously embodied and modified within the scope of the subjoined claims.

What is claimed is:

A cable junction for metallic sheathed cable comprising a junction box to receive a range of cable sizes, said junction box having an elongated annular neck portion, a plurality of radially extending ridges formed on the interior of said extended neck portion, said ridges being separated by varied axial separations, an annular fitting having an inner diameter substantially the same diameter as the outer diameter of the cable sheath and an outer diameter equal to the diameter of the interior of said neck portion, said sheath being upset into circumferentially continuous, radially extending flanges on both sides of said fitting, said fitting being placed between adjacent ridges and coacting with said ridges to anchor said sheathed cable within the neck portion of said junction box.

References Cited in the file of this patent

UNITED STATES PATENTS

| | | |
|---|---|---|
| 297,927 | Goebel | Apr. 29, 1884 |
| 672,034 | Cunningham | Apr. 16, 1901 |
| 2,423,924 | Augenstein et al. | July 15, 1947 |
| 2,578,638 | Winter | Dec. 11, 1951 |